United States Patent
Xie et al.

(10) Patent No.: US 11,885,962 B2
(45) Date of Patent: Jan. 30, 2024

(54) DISPLAY ADJUSTMENT METHOD AND APPARATUS, SYSTEM, AND STORAGE MEDIUM

(71) Applicant: HUAWEI TECHNOLOGIES CO., LTD., Shenzhen (CN)

(72) Inventors: Yuefei Xie, Dongguan (CN); Biwei Song, Dongguan (CN); Shuyue Chen, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/979,199

(22) Filed: Nov. 2, 2022

(65) Prior Publication Data

US 2023/0061733 A1    Mar. 2, 2023

Related U.S. Application Data

(63) Continuation of application No. PCT/CN2021/093103, filed on May 11, 2021.

(30) Foreign Application Priority Data

May 15, 2020   (CN) .......................... 202010415129.4

(51) Int. Cl.
G02B 27/01    (2006.01)
G06F 3/01     (2006.01)
G09G 3/00     (2006.01)

(52) U.S. Cl.
CPC ......... *G02B 27/0101* (2013.01); *G06F 3/013* (2013.01); *G09G 3/003* (2013.01); *G02B 2027/014* (2013.01); *G09G 2320/0686* (2013.01); *G09G 2354/00* (2013.01); *G09G 2380/10* (2013.01)

(58) Field of Classification Search
CPC ................... G02B 2027/0178; G02B 27/0172
See application file for complete search history.

(56) References Cited

U.S. PATENT DOCUMENTS

| 7,036,025 B2 | 4/2006 | Hunter |
| 2003/0135288 A1 | 7/2003 | Ranganathan et al. |
| 2003/0146897 A1 | 8/2003 | Hunter |
| 2007/0146344 A1* | 6/2007 | Martin ..................... G09G 5/00 345/173 |

(Continued)

FOREIGN PATENT DOCUMENTS

| CN | 101385071 A | 3/2009 |
| CN | 102073370 A | 5/2011 |

(Continued)

*Primary Examiner* — Nan-Ying Yang

(74) *Attorney, Agent, or Firm* — Maier & Maier, PLLC

(57) ABSTRACT

A display adjustment method and apparatus, a system, and a storage medium. The method includes: obtaining a reference position from an image displayed by a head-up display HUD system, where the reference position is related to a focal position, on the image displayed by the HUD system, of an eye of a user; obtaining a brightness weakening coefficient of each pixel based on a distance between each pixel in the image and the reference position; adjusting display brightness of each pixel in the image based on the brightness weakening coefficient of each pixel; and displaying an adjusted image based on the display brightness of each pixel in the adjusted image.

14 Claims, 5 Drawing Sheets

(56) References Cited

U.S. PATENT DOCUMENTS

2012/0093358 A1    4/2012  Tschirhart
2012/0313850 A1*  12/2012  Ishida ................ G02B 27/0101
                                                          345/691
2018/0136719 A1    5/2018  Chen

FOREIGN PATENT DOCUMENTS

| CN | 103686391 A | 3/2014 |
| CN | 106445104 A | 2/2017 |
| CN | 106454310 A | 2/2017 |
| CN | 106534494 A | 3/2017 |
| CN | 106950698 A | 7/2017 |
| CN | 107728770 A | 2/2018 |
| JP | 201918770 A | 2/2019 |

* cited by examiner

DISPLAY ADJUSTMENT METHOD AND APPARATUS, SYSTEM, AND STORAGE MEDIUM

CROSS-REFERENCE TO RELATED APPLICATIONS

This application is a continuation of International Application No. PCT/CN2021/093103, filed on May 11, 2021, which claims priority to Chinese Patent Application No. 202010415129.4, filed on May 15, 2020. The disclosures of the aforementioned applications are hereby incorporated by reference in their entireties.

TECHNICAL FIELD

The embodiments relate to a head up display (HUD) technology, a display adjustment method and apparatus, a system, and a storage medium.

BACKGROUND

With continuous improvement of living standards, vehicles have become indispensable tools in people's lives. To ensure safer and more convenient driving, various driver assistance systems emerge, such as a lane keeping assist system, an automatic parking assist system, and a brake assist system.

Currently, with development of driver assistance systems, a HUD system is widely used in practice. The HUD system may also be referred to as a parallel display system and is a system that projects an image (a HUD image for short) containing important driving information (for example, a speed per hour and navigation) of a vehicle onto windshield in front of a driver for display. By using the HUD system, the driver can see the important driving information without lowering or turning the head, so that the driver focuses more on road conditions ahead, thereby improving driving safety.

However, a display mode of a HUD image of an existing HUD system may easily distract attention of the driver and may also easily cause visual fatigue of the driver.

SUMMARY

The embodiments may provide a display adjustment method and apparatus, a system, and a storage medium, which are configured to resolve problems that a display mode of a HUD image of a HUD system easily distracts attention of a driver and easily causes visual fatigue of the driver.

According to a first aspect, an embodiment may provide a display adjustment method. The method is applied in a HUD system. The method may include: obtaining a reference position from an image displayed by the HUD system, where the reference position is related to a focal position, on the image displayed by the HUD system, of an eye of a user; obtaining a brightness weakening coefficient of each pixel based on a distance between each pixel in the image and the reference position; adjusting display brightness of each pixel in the image based on the brightness weakening coefficient of each pixel; and displaying an adjusted image based on the display brightness of each pixel in the adjusted image.

In the method, the display brightness of each pixel in the HUD image may be adjusted based on the reference position that is related to the focal position. For example, brightness of a pixel in an area on which a driver does not focus can be weakened, so that the driver focuses more on information to be obtained by the driver in the HUD image. Therefore, a case in which the driver is distracted by irrelevant information when viewing the HUD image can be avoided, and visual fatigue of the driver can be reduced. This plays an important role in reducing occurrence of traffic accidents.

In a possible implementation, the brightness weakening coefficient of the pixel may be positively or negatively correlated with a weakening degree of the display brightness of the pixel.

In a possible implementation, the obtaining a brightness weakening coefficient of each pixel based on a distance between each pixel in the image and the reference position includes: obtaining an initial brightness weakening coefficient of the pixel based on the distance between each pixel in the image and the reference position; and obtaining the brightness weakening coefficient of the pixel based on the initial brightness weakening coefficient of the pixel.

For example, the obtaining the brightness weakening coefficient of the pixel based on the initial brightness weakening coefficient of the pixel may include the following four manners:

In a first manner, the initial brightness weakening coefficient is used as the brightness weakening coefficient of the pixel.

In a second manner, if the initial brightness weakening coefficient of the pixel is greater than or equal to a preset threshold, the brightness weakening coefficient of the pixel is set to a first value, where the first value is greater than the preset threshold. Alternatively, if the initial brightness weakening coefficient of the pixel is less than the preset threshold, the initial brightness weakening coefficient of the pixel is used as the brightness weakening coefficient of the pixel.

In a third manner, if the pixel is located in a user focus area, the initial brightness weakening coefficient of the pixel is used as the brightness weakening coefficient of the pixel, where the user focus area is related to the focal position or the reference position. If the pixel is not located in the user focus area, the brightness weakening coefficient of the pixel is set to a second value.

In a fourth manner, if the initial brightness weakening coefficient of the pixel is greater than or equal to a preset threshold, the brightness weakening coefficient of the pixel is set to a third value, where the third value is greater than the preset threshold. Alternatively, if the initial brightness weakening coefficient of the pixel is less than the preset threshold and the pixel is not located in a user focus area, the brightness weakening coefficient of the pixel is set to a fourth value, where the fourth value is greater than the preset threshold, and the user focus area is related to the focal position or the reference position. Alternatively, if the initial brightness weakening coefficient of the pixel is less than the preset threshold and the pixel is located in the user focus area, the initial brightness weakening coefficient of the pixel is used as the brightness weakening coefficient of the pixel.

In any of the foregoing manners, while the brightness of the pixel in the area on which the driver focus is ensured, brightness of a pixel in an area on which the driver does not focus can be weakened, so that the driver focuses more on the information to be obtained by the driver in the HUD image. Therefore, a case in which the driver is distracted by irrelevant information when viewing the HUD image can be avoided, and visual fatigue of the driver can be reduced. This plays an important role in reducing occurrence of traffic accidents.

Optionally, the preset threshold is preset; the preset threshold is determined based on an initial brightness weakening coefficient of a pixel located at an edge of the image;

or the method further includes: receiving the preset threshold input by the user. For example, the preset threshold may be a real number that is greater than 0 and is less than the initial brightness weakening coefficient of the pixel located at the edge of the image.

Optionally, that the brightness weakening coefficient of the pixel is positively correlated with the weakening degree of the display brightness of the pixel is used as an example. When the reference position is used as a central position of brightness weakening, the initial brightness weakening coefficient of the pixel meets the following formula:

$$V_{pix\_1}^i = \begin{cases} \dfrac{\alpha}{dist(i)^n} + \beta & (dist(i)^n \neq 0) \\ 0 & (dist(i)^n = 0) \end{cases}$$

In the foregoing formula, i is an integer that is greater than or equal to 0, $V_{pix\_1}^i$ is an initial brightness weakening coefficient of an $i^{th}$ pixel, dist(i) is a distance between the $i^{th}$ pixel and the reference position, n and $\alpha$ each are a positive real number, and $\beta$ is a real number.

It should be understood that the reference position may be same as or different from the focal position. That is, the reference position and the focal position may be a same position or different positions in the HUD image. In other words, the reference position is the focal position, the reference position is not the focal position, or the like.

Optionally, that the brightness weakening coefficient of the pixel is positively correlated with the weakening degree of the display brightness of the pixel is used as an example. When the focal position is used as the central position of brightness weakening, the obtaining an initial brightness weakening coefficient of the pixel based on the distance between each pixel in the image and the reference position includes: obtaining the initial brightness weakening coefficient of the pixel based on the distance between each pixel in the image and the reference position and an offset of the focal position relative to the reference position. For example, the initial rightness weakening coefficient of the pixel meets the following formula:

$$V_{pix\_1}^i = \begin{cases} \dfrac{\alpha}{dist(i-\sigma)^n} + \beta & (dist(i-\sigma)^n \neq 0) \\ 0 & (dist(i-\sigma)^n = 0) \end{cases}$$

In the foregoing formula, i is an integer that is greater than or equal to 0, $V_{pix\_1}^i$ an initial brightness weakening coefficient of an $i^{th}$ pixel, dist(i–σ) is a distance between an (i–σ)$^{th}$ pixel and the reference position, a is the offset of the focal position relative to the reference position, n and $\alpha$ each are a positive real number, and $\beta$ is a real number.

In a possible implementation, the adjusting display brightness of each pixel in the image based on the brightness weakening coefficient of each pixel includes: adjusting the display brightness of each pixel in the image based on the brightness weakening coefficient of each pixel by using a spatial light modulator of the HUD system. For example, the spatial light modulator includes a first sub-spatial light modulator and a second sub-spatial light modulator, and an image pixel of the first sub-spatial light modulator is aligned with an image pixel of the second sub-spatial light modulator. Therefore, the adjusting the display brightness of each pixel in the image based on the brightness weakening coefficient of each pixel by using a spatial light modulator of the HUD system includes: loading the brightness weakening coefficient of each pixel into the first sub-spatial light modulator, to obtain a brightness adjustment image; and loading the image into the second sub-spatial light modulator, where the brightness adjustment image is used to adjust brightness of a light source emitted to the second sub-spatial light modulator, to change display brightness of each pixel in the image loaded into the second sub-spatial light modulator.

In the possible implementation, because the SLM adjusts the display brightness of each pixel in the image through hardware of the SLM without software operation, that the SLM adjusts the display brightness of each pixel in the image can improve a speed of adjusting the display brightness of the image, thereby improving real-time performance of the HUD system.

In a possible implementation, before the obtaining a reference position from an image displayed by the HUD system, the method further includes: receiving the focal position sent by a visual positioning apparatus. Alternatively, before the obtaining a reference position from an image displayed by the HUD system, the method further includes: collecting a facial image of the user when the user views an image; determining a position of an eye of the user based on the facial image; and obtaining the focal position based on the position of the eye of the user and a mapping relationship between the position of the eye and coordinate points of the image.

In this possible implementation, the focal position can be flexibly obtained, and implementations of this solution are expanded.

According to a second aspect, an embodiment may provide a display adjustment apparatus. The display adjustment apparatus includes a processing module and a display module. Optionally, the apparatus may further include a transceiver module and/or a collection module.

The processing module is configured to: obtain a reference position from an image displayed by a HUD system, where the reference position is related to a focal position, on the image displayed by the HUD system, of an eye of a user; obtain a brightness weakening coefficient of each pixel based on a distance between each pixel in the image and the reference position; and adjust display brightness of each pixel in the image based on the brightness weakening coefficient of each pixel.

The display module is configured to display an adjusted image based on the display brightness of each pixel of the adjusted image.

In a possible implementation, the brightness weakening coefficient of a pixel is positively correlated with a weakening degree of the display brightness of the pixel.

In a possible implementation, the processing module is configured to: obtain an initial brightness weakening coefficient of a pixel based on a distance between each pixel in the image and the reference position; and obtain a brightness weakening coefficient of the pixel based on the initial brightness weakening coefficient of the pixel.

For example, the brightness weakening coefficient of the pixel may be obtained based on the initial brightness weakening coefficient of the pixel in the following four manners:

In a first manner, the initial brightness weakening coefficient is used as the brightness weakening coefficient of the pixel.

In a second manner, if the initial brightness weakening coefficient of the pixel is greater than or equal to a preset threshold, the brightness weakening coefficient of the pixel is set to a first value, where the first value is greater than the preset threshold. Alternatively, if the initial brightness weakening coefficient of the pixel is less than the preset threshold, the initial brightness weakening coefficient of the pixel is used as the brightness weakening coefficient of the pixel.

In a third manner, if the pixel is located in a user focus area, the initial brightness weakening coefficient of the pixel is used as the brightness weakening coefficient of the pixel, where the user focus area is related to the focal position or the reference position. If the pixel is not located in the user focus area, the brightness weakening coefficient of the pixel is set to a second value.

In a fourth manner, if the initial brightness weakening coefficient of the pixel is greater than or equal to a preset threshold, the brightness weakening coefficient of the pixel is set to a third value, where the third value is greater than the preset threshold. Alternatively, if the initial brightness weakening coefficient of the pixel is less than the preset threshold and the pixel is not located in a user focus area, the brightness weakening coefficient of the pixel is set to a fourth value, where the fourth value is greater than the preset threshold, and the user focus area is related to the focal position or the reference position. Alternatively, if the initial brightness weakening coefficient of the pixel is less than the preset threshold and the pixel is located in the user focus area, the initial brightness weakening coefficient of the pixel is used as the brightness weakening coefficient of the pixel.

Optionally, the preset threshold is preset; the preset threshold is determined based on the initial brightness weakening coefficient of a pixel located at an edge of the image; or the processing module is further configured to receive, through the transceiver module, a preset threshold input by the user. For example, the preset threshold may be a real number that is greater than 0 and is less than the initial brightness weakening coefficient of the pixel located at the edge of the image.

Optionally, that the brightness weakening coefficient of the pixel is positively correlated with the weakening degree of the display brightness of the pixel is used as an example. When the reference position is used as a central position of brightness weakening, the initial brightness weakening coefficient of the pixel meets the following formula:

$$V_{pix\_1}^i = \begin{cases} \dfrac{\alpha}{dist(i)^n} + \beta & (dist(i)^n \neq 0) \\ 0 & (dist(i)^n = 0) \end{cases}$$

In the foregoing formula, i is an integer that is greater than or equal to 0, $V_{pix\_1}^i$ an initial brightness weakening coefficient of an $i^{th}$ pixel, dist(i) is a distance between the $i^{th}$ pixel and the reference position, n and $\alpha$ each are a positive real number, and $\beta$ is a real number.

It should be understood that the reference position may be same as or different from the focal position. That is, the reference position and the focal position may be a same position or different positions in the HUD image. In other words, the reference position is the focal position, the reference position is not the focal position, or the like.

Optionally, that the brightness weakening coefficient of the pixel is positively correlated with the weakening degree of the display brightness of the pixel is used as an example. When the focal position is used as the central position of brightness weakening, the processing module is configured to obtain the initial brightness weakening coefficient of the pixel based on the distance between each pixel in the image and the reference position and an offset of the focal position relative to the reference position. For example, the initial rightness weakening coefficient of the pixel meets the following formula:

$$V_{pix\_1}^i = \begin{cases} \dfrac{\alpha}{dist(i-\sigma)^n} + \beta & (dist(i-\sigma)^n \neq 0) \\ 0 & (dist(i-\sigma)^n = 0) \end{cases}$$

In the foregoing formula, i is an integer that is greater than or equal to 0, $V_{pix\_1}^i$ an initial brightness weakening coefficient of an $i^{th}$ pixel, dist(i−σ) is a distance between an $(i-\sigma)^{th}$ pixel and the reference position, σ is the offset of the focal position relative to the reference position, n and α each are a positive real number, and β is a real number.

In a possible implementation, the processing module is configured to adjust the display brightness of each pixel in the image based on the brightness weakening coefficient of each pixel by using a spatial light modulator of the HUD system. For example, the spatial light modulator includes a first sub-spatial light modulator and a second sub-spatial light modulator, and an image pixel of the first sub-spatial light modulator is aligned with an image pixel of the second sub-spatial light modulator. The processing module is configured to: load the brightness weakening coefficient of each pixel into the first sub-spatial light modulator, to obtain a brightness adjustment image; and load the image into the second sub-spatial light modulator, where the brightness adjustment image is used to adjust brightness of a light source emitted to the second sub-spatial light modulator, to change display brightness of each pixel in the image loaded into the second sub-spatial light modulator.

In a possible implementation, the processing module is further configured to receive, through the transceiver module, the focal position sent by a visual positioning apparatus before obtaining the reference position from the image displayed by the HUD system.

In a possible implementation, the processing module is further configured to receive, through the transceiver module, the focal position sent by a visual positioning apparatus before obtaining the reference position from the image displayed by the HUD system; the collection module is configured to collect a facial image of the user when the user views the image; and the processing module is configured to determine a position of an eye of the user based on the facial image, and obtain the focal position based on the position of the eye of the user and a mapping relationship between the position of the eye and coordinate points of the image.

For beneficial effects of the display adjustment apparatus provided in the second aspect and any possible implementation of the second aspect, refer to the beneficial effects in the first aspect and any possible implementation of the first aspect, which are not described herein again.

According to a third aspect, an embodiment may provide a display adjustment apparatus. The display adjustment apparatus includes a processor and a memory. The memory is configured to store computer executable program code. The program code includes computer executable instructions. When the processor executes the computer executable instructions, the computer executable instructions enable the display adjustment apparatus to perform the method provided in the first aspect or any possible implementation of the first aspect.

According to a fourth aspect, an embodiment may provide a display adjustment apparatus, including a unit, module, or circuit that is configured to perform the method provided in the first aspect or any possible implementation of the first aspect. The display adjustment apparatus may be a HUD system or a module used in a HUD system, for example, may be a chip applied in a HUD system.

According to a fifth aspect, an embodiment may provide a display adjustment apparatus. The display adjustment apparatus stores a computer program. When the computer program is executed by the display adjustment apparatus, the method provided in the first aspect or any possible implementation of the first aspect is implemented. For example, the display adjustment apparatus may be a chip.

According to a sixth aspect, an embodiment may provide a display adjustment apparatus. The display adjustment apparatus includes a processor and an interface circuit. The interface circuit is configured to receive computer executable instructions and transmit the computer executable instructions to the processor; and the processor runs the computer executable instructions to perform the method provided in the first aspect or any possible implementation of the first aspect. For example, the display adjustment apparatus may be a chip.

According to a seventh aspect, an embodiment may provide a display adjustment apparatus. The display adjustment apparatus includes a processor and a memory. The memory is configured to store computer executable instructions. The processor is configured to execute computer executable instructions stored in the memory, to enable the display adjustment apparatus to perform the method provided in the first aspect or any possible implementation of the first aspect. For example, the display adjustment apparatus may be a chip.

According to an eighth aspect, an embodiment may provide a display adjustment apparatus. The display adjustment apparatus includes a processor, a memory, and a transceiver. The transceiver is configured to receive or send signals. The memory is configured to store a computer program. The processor is configured to invoke the computer program from the memory, to perform the method provided in the first aspect, any possible implementation of the first aspect, the second aspect, or any possible implementation of the second aspect. For example, the display adjustment apparatus may be a chip.

According to a ninth aspect, an embodiment may provide a computer program product. The computer program product includes computer program code. When the computer program code is run on a computer, the computer is enabled to perform the method provided in the first aspect or any possible implementation of the first aspect.

According to a tenth aspect, an embodiment may provide a non-transitory computer readable storage medium. The non-transitory computer readable storage medium is configured to store computer programs or computer executable instructions. When the computer programs or the computer execution instructions are run on a computer, the computer is enabled to perform the method provided in the first aspect or any possible implementation of the first aspect.

According to an eleventh aspect, an embodiment may provide a HUD system. The HUD system includes a processor, a memory, and a display component. The memory is configured to store computer executable instructions. The processor is configured to execute the computer executable instructions stored in the memory, to adjust display brightness of each pixel in an image by using the method provided in the first aspect or any possible implementation of the first aspect. The display component is configured to display a real image of an adjusted image based on the display brightness of each pixel in the adjusted image.

According to a twelfth aspect, an embodiment may provide a manner of transportation. The manner of transportation includes the HUD system described above. For example, the manner of transportation may be a vehicle, aircraft, or a rail traffic facility.

With the display adjustment method and apparatus, system, and storage medium provided in the embodiments, display brightness of each pixel in a HUD image can be adjusted based on a reference position related to a focal position. For example, brightness of a pixel in an area on which a driver does not focus can be weakened, so that the driver focuses more on information to be obtained by the driver in the HUD image. Therefore, a case in which the driver is distracted by irrelevant information when viewing the HUD image can be avoided, and visual fatigue of the driver can be reduced. This plays an important role in reducing occurrence of traffic accidents.

BRIEF DESCRIPTION OF THE DRAWINGS

FIG. 4 is a schematic diagram of a structure of an SLM according to an;

DETAILED DESCRIPTION OF THE EMBODIMENTS

Figure 1:
FIG. 1 is a schematic diagram of a HUD image displayed by an existing HUD system.

FIG. 1 is a schematic diagram of a HUD image displayed by an existing HUD system. As shown in FIG. 1, that the HUD image displays lane lines is used as an example. Currently, when the existing HUD system displays the HUD image, each pixel of the HUD image is displayed by using same brightness. When a driver views the HUD image, the driver cannot focus on information to be obtained in the HUD image, which tends to distract attention of the driver and leads to visual fatigue of the driver.

Currently, some HUD systems can adjust brightness of a HUD image based on brightness of an ambient environment detected by a photosensor, so that a driver can see a clear HUD image under various light environments. However, pixels in the HUD image displayed in this manner still have same lightness, and the foregoing described problem cannot be resolved.

Considering that an eye of the driver pays different attention to different positions of the HUD image, for example, the driver pays more attention to an area in which a focal position is located than an edge area, an embodiment may provide a display adjustment method in which display brightness of each pixel in a HUD image can be adjusted based on a reference position related to the focal position, to weaken brightness of a pixel in an area on which the driver does not focus, so that the driver focuses more on information to be obtained by the driver in the HUD image. Therefore, a case in which the driver is distracted by irrelevant information when viewing the HUD image can be avoided, and visual fatigue of the driver can be reduced. This plays an important role in reducing occurrence of traffic accidents.

Figure 2:
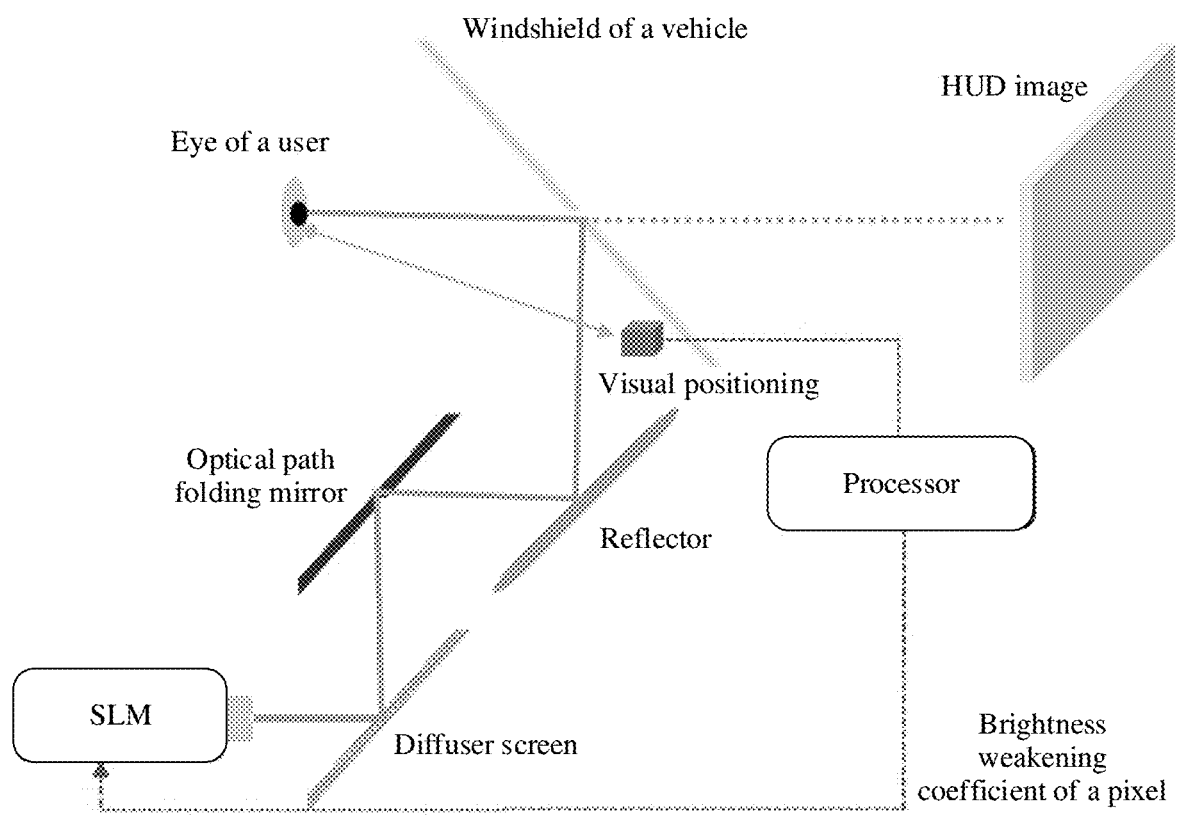
FIG. 2 is a schematic diagram of a structure of a HUD system according to an embodiment.

To facilitate understanding of the embodiments, the following first gives an example description of the HUD system in the embodiments. FIG. 2 is a schematic diagram of a structure of a HUD system according to an embodiment. As shown in FIG. 2, a HUD system mounted on a vehicle is used as an example. The HUD system may include a memory (not shown in the figure), a processor, and a display component. The memory and the processor are communicatively connected to each other. For example, the memory and the processor may be communicatively connected to each other through network connection. Alternatively, the HUD system may further include a bus. The memory and the processor may be communicatively connected to each other by using the bus. It should be understood that, when the HUD system includes the bus, the bus may include a channel for transmitting information between a plurality of components (for example, the memory and the processor) of the HUD system.

The memory can store a program. When the program stored in the memory is executed by the processor, the processor is configured to, for example, adjust display brightness of each pixel of a HUD image based on a reference position on the HUD image. For a description of the reference position, refer to subsequent embodiments.

The display component may include a diffuser screen, an optical path folding mirror, a reflector (for example, a free-form surface reflector), and the like. For example, the display module may be configured to display a real image of an adjusted image based on display brightness of each pixel in the adjusted image. For example, the HUD system evenly extends light to an entire plane of the diffuser screen to form a real image on the diffuser screen, and the real image is projected onto a windshield of the vehicle through the optical path folding mirror and the reflector, to form a HUD image in front of the windshield of the vehicle.

The memory may include a read-only memory (ROM), a static storage device, a dynamic storage device, or a random access memory (RAM).

The processor may include a general-purpose central processing unit (CPU), a microprocessor, or a microcontroller, and further include an application specific integrated circuit (ASIC), a graphics processing unit (GPU), or one or more integrated circuits.

The processor may alternatively be an integrated circuit chip and has a signal processing capability. In an implementation process, a function of the HUD system can be completed through an integrated logic circuit of hardware in the processor or an instruction in the form of software. The processor may further include a general purpose processor, a digital signal processor (DSP), an application specific integrated circuit (ASIC), a field programmable gate array (FPGA), or another programmable logic component, a discrete gate or transistor logic device, or a discrete hardware component, and can implement or execute methods, steps, and logic block diagrams in the following embodiments. The general-purpose processor may be a microprocessor, any conventional processor, or the like, for example, the CPU, microprocessor, or microcontroller described above. The steps of the method with reference to the following embodiments may be directly performed by a processor or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the function of the HUD system in this embodiment with reference to hardware of the memory.

Optionally, in some embodiments, the HUD system may further include a spatial light modulator (SLM), and the processor may use the SLM to adjust the display brightness of each pixel in the HUD image.

Optionally, in some embodiments, the HUD system may further include a communication interface. The communication interface uses, for example, but is not limited to, a transceiver module such as a transceiver, to implement communication between the HUD system and another device or a communication network. For example, the communication interface may be used to perform image transmission (for example, a left rear video of the vehicle or a right rear video of the vehicle). For another example, the communication interface may be used to receive the reference position of the HUD image transmitted by a visual positioning apparatus, so that the processor can adjust the display brightness of each pixel in the HUD image based on the reference position.

Optionally, in some embodiments, the HUD system may further include a decoder. For example, the decoder can be configured to decode an image received by the communication interface.

Optionally, in some embodiments, the HUD system may further include a camera sensor, an image signal processor (ISP), and the like. The camera sensor can be configured to, for example, collect facial image data when a user views the HUD image; and the ISP can be configured to, for example, process the facial image data to obtain a frame of facial image. In this case, the processor can obtain the reference position of the HUD image through the facial image and adjust the display brightness of each pixel in the HUD image based on the reference position.

Optionally, in some embodiments, the HUD system may further include a camera sensor that is configured to collect another image, for example, a camera sensor for collecting a left rear video of the vehicle or a right rear video of the vehicle. Correspondingly, the ISP can, for example, process the data collected by the camera sensor to obtain an image to be displayed, and the image is displayed after the processor adjusts the display brightness according to the method in this embodiment.

Optionally, in some embodiments, the HUD system may further include a power supply that is configured to supply power to each component of the HUD system.

It should be understood that the HUD system shown in FIG. 2 is only schematic. The method in this embodiment may further be applied to a HUD system with another architecture, a HUD system with another function, or the like. This is not limited.

The following uses the HUD system shown in FIG. 2 as an example, to describe the embodiments in detail. The following several embodiments may be combined with each other, and a same or similar concept or process may not be described repeatedly in some embodiments.

Figure 3:
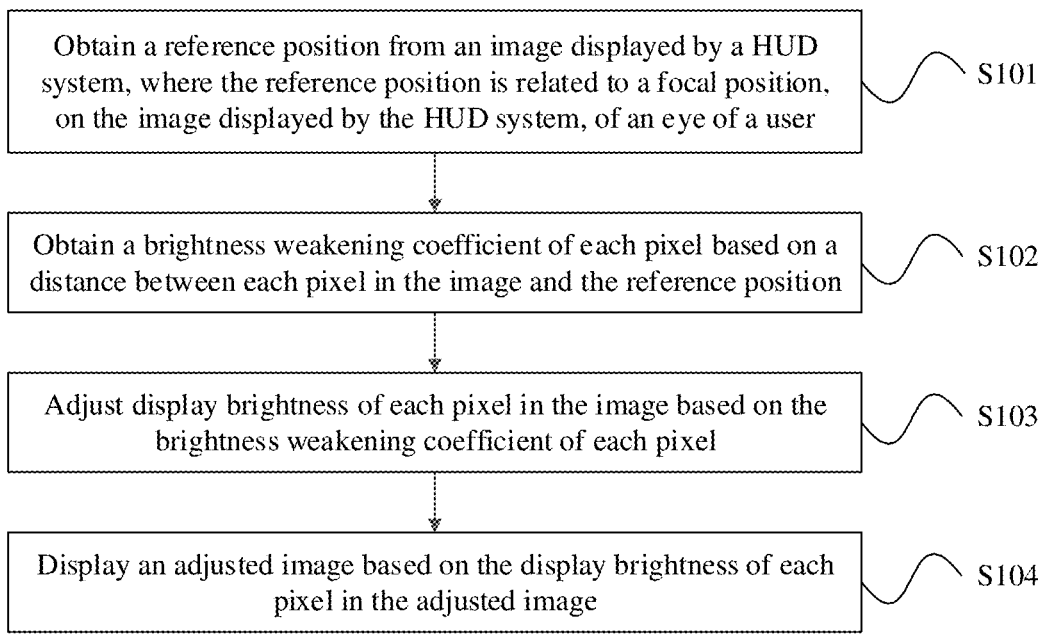
FIG. 3 is a schematic flowchart of a display adjustment method according to an embodiment.

FIG. 3 is a schematic flowchart of a display adjustment method according to an embodiment. This embodiment relates to how a HUD system adjusts display brightness of each pixel in a HUD image based on a reference position of the HUD image. As shown in FIG. 3, the method may include the following steps:

S101: Obtain a reference position from an image displayed by the HUD system, where the reference position is related to a focal position, on the image displayed by the HUD system, of an eye of a user. The image described herein is a HUD image.

The focal position in this embodiment refers to a position of a focal point of the eye when the user views the HUD image. It should be understood that the focal position described herein may be a position of a focal point of two eyes when the user uses the two eyes to view the HUD image. The focal position may alternatively be a position of a focal point of a single eye when the user uses the single eye to view the HUD image. In other words, the focal position is the position of the focal point of the eyes when the current user views the HUD image in any manner.

The manner of obtaining the focal position by the HUD system is not limited in this embodiment. In a possible implementation, the HUD system may be connected to a visual positioning apparatus of a vehicle, and the visual positioning apparatus can detect the focal position when the user views the HUD image and send the detected focal position to the HUD system. For example, the visual positioning apparatus can send the detected focal position to the HUD system through a communication interface of the HUD system. Alternatively, the visual positioning apparatus can send the detected focal position to the HUD system through a wireless connection established with the HUD system. For a mounting position of the visual positioning apparatus and how the visual positioning apparatus detects the focal position, refer to the conventional technology. This is not limited in this embodiment.

In another possible implementation, in the HUD system, a camera sensor may be disposed at a position at which a user image can be obtained. Therefore, the HUD system can collect a facial image when the user views the HUD image. Then, the HUD system can determine a position of an eye of the user based on the facial image. Further, the HUD system can obtain the focal position of the eye on the HUD image based on the position of the eye of the user and a mapping relationship between the position of the eye and coordinate points of the HUD image.

In this embodiment, when the user views the HUD image displayed by the HUD system, the HUD system can obtain the reference position that is related to the focal position. That is, the reference position in the HUD image is related to the focal position in the HUD image. In other words, the reference position changes as the focal position changes. Optionally, the reference position may be the focal position, and may alternatively be a position that meets a preset constraint relationship with the focal position. The preset constraint relationship may be determined based on a visual preference of the user. For example, the reference position may be a position at a preset distance from the focal position; the reference position may be a position that meets a preset angle with the focal position; the reference position may be a position that is at a preset distance from the focal position and meets a preset angle; or the like. For example, a processor of the HUD system can obtain the reference position that is related to the focal position.

It should be noted that a pixel is a unit in an image, and a frame of image includes a plurality of pixels. Each pixel has a position and an allocated color value in the image. Positions and color values of all pixels determine an appearance presented by the image. In some embodiments, a pixel may be referred to as a picture element. This is not distinguished in this embodiment. A quantity of pixels included in a frame of image is related to resolution of the image. If the resolution of the image is 1080×1920, the image includes 1080×1920 pixels.

Therefore, the reference position and the focal position that are described above may be a position of one pixel or positions of a plurality of adjacent pixels in the HUD image. That is, the reference position and the focal position may be represented by coordinates of the one pixel or the plurality of adjacent pixels in the HUD image. For example, the focal position is a position in which a pixel (400, 1000) is located, a coordinate value of the focal position on an x coordinate axis of the HUD image is 400, and a coordinate value on a y coordinate axis is 1000. In other words, the focal position is a pixel at row 400 and column 1000 in the HUD image.

In some embodiments, the HUD image is an image presented by the HUD system through a HUD optical display unit. Therefore, in some embodiments, the reference position and the focal position that are described above may alternatively be described as a position on a HUD light display unit or may be represented by coordinates on the HUD light display unit. This is not limited in this embodiment.

S102: Obtain a brightness weakening coefficient of each pixel based on a distance between each pixel in the image and the reference position.

It should be understood that a quantity of brightness weakening coefficients of pixels obtained herein is related to a quantity of pixels included in a frame of HUD image. For example, if the HUD image includes 1080×1920 pixels, 1080×1920 brightness weakening coefficients of the pixels may be obtained herein.

Optionally, a brightness weakening coefficient of a pixel is positively correlated with a weakening degree of display brightness of the pixel; a range of the brightness weakening coefficient of the pixel is positively correlated with the weakening degree of the display brightness of the pixel; the brightness weakening coefficient of the pixel is negatively correlated with the weakening degree of the display brightness of the pixel; or the range of the brightness weakening coefficient of the pixel is negatively correlated with the weakening degree of the display brightness of the pixel. For example, the following table 1 shows a schematic example in which the range of the brightness weakening coefficient is positively correlated with the weakening degree of the display brightness of the pixel.

TABLE 1

| Serial number | Range of a brightness weakening coefficient | Weakening degree of display brightness of a pixel |
| --- | --- | --- |
| 1 | [0, 1] | Weakening degree 0 |
| 2 | [1.1, 3] | Weakening degree 1 |
| ... | ... | ... |
| N | [X-m, X] | Weakening degree Y |

Optionally, the reference position may be used as a central position of brightness weakening, to obtain the brightness weakening coefficient of each pixel in the HUD image. That is, brightness of the pixel in which the reference position is located remains unchanged. The brightness weakening coefficients of the remaining pixels are related to distances between the pixels and the reference position. Optionally, the focal position may be used as the central position of brightness weakening, to obtain the brightness weakening coefficient of each pixel in the HUD image. That is, brightness of the pixel in which the focal position is located remains unchanged. The brightness weakening coefficients of the remaining pixels are related to the distances between the pixels and the reference position, and an offset of the focal position relative to the reference position. Which position is used as the central position of brightness weakening may be set according to a requirement of the user.

In this manner, for example, while brightness of a pixel in an area on which a driver focuses is ensured, brightness of a pixel in an area on which the driver does not focus can be weakened, so that the driver focuses more on information in the HUD image to be obtained by the driver. Therefore, a case in which the driver is distracted by irrelevant information when viewing the HUD image be avoided, and visual fatigue of the driver can be reduced. This plays an important role in reducing occurrence of traffic accidents.

For how to obtain the brightness weakening coefficient of each pixel based on the distance between each pixel in the image and the reference position, refer to the following description.

S103: Adjust display brightness of each pixel in the image based on the brightness weakening coefficient of each pixel.

In a possible implementation, the processor of the HUD system may use a current brightness adjustment algorithm and adjust the display brightness of each pixel in the HUD image by using the brightness weakening coefficient of each pixel.

In another possible implementation, an SLM may be disposed in the HUD system, and the HUD system can adjust the display brightness of each pixel in the HUD image based on the brightness weakening coefficient of each pixel by using the spatial light modulator of the HUD system. For example, the processor of the HUD system is connected to the SLM through a high definition multimedia interface (HDMI), and the processor loads the brightness weakening coefficient of each pixel and the HUD image onto the SLM through the HDMI, to adjust the display brightness of each pixel in the HUD image based on the brightness weakening coefficient of each pixel by using the SLM. For example, the SLM can change a state of a liquid crystal molecule through a voltage based on the brightness weakening coefficient of each pixel in the HUD image, to adjust parameters such as an amplitude, a refractive index, and a polarization plane of a light field, thereby adjusting the display brightness of each pixel in the HUD image. Because the SLM adjusts the display brightness of each pixel in the HUD image through hardware of the SLM without software operation, that the SLM adjusts the display brightness of each pixel in the HUD image can improve a speed of adjusting the display brightness of the HUD image.

Figure 4:
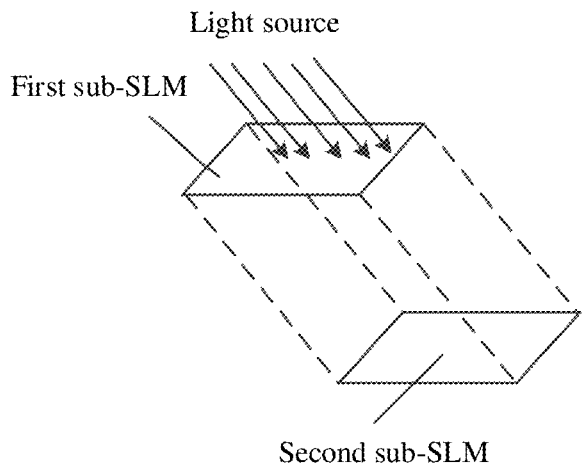

For example, FIG. 4 is a schematic diagram of a structure of the SLM provided in this embodiment. As shown in FIG. 4, the SLM may include a first sub-SLM and a second sub-SLM, and an image pixel of the first sub-SLM is aligned with an image pixel of the second sub-SLM. It should be understood that a quantity of image pixels of the first sub-SLM, a quantity of image pixels of the second sub-SLM, and a quantity of pixels of the HUD image are the same. Optionally, the first sub-SLM and the second sub-SLM may be implemented by using, for example, a liquid crystal on silicon (LCOS) chip.

The processor of the HUD system can load the brightness weakening coefficient of each pixel in the HUD image into the first sub-SLM to obtain a brightness-adjusted image and load the HUD image into the second sub-SLM. That is, the processor sends the brightness weakening coefficient of each pixel in the HUD image to the first sub-SLM and sends the HUD image to the second sub-SLM. The first sub-SLM displays a brightness-adjusted image based on the brightness weakening coefficient of each pixel in the HUD image. Brightness of each pixel in the brightness-adjusted image is consistent with a brightness weakening degree corresponding to the brightness weakening coefficient of the pixel. The second sub-SLM displays the HUD image. When a light source is emitted from the first sub-SLM to the second sub-SLM, the brightness-adjusted image displayed by the first sub-SLM can adjust brightness of the light source emitted to the second sub-SLM, that is, change the brightness of the light source emitting to each image pixel of the second sub-SLM, thereby changing the display brightness of each pixel in the HUD image displayed by the second sub-SLM. It should be understood that the light source described herein may be light emitted by a device for providing light in the HUD system.

It should be understood that the HUD system may adjust the display brightness of each pixel in the HUD image based on the brightness weakening coefficient of each pixel in another existing manner of adjusting display brightness.

S104: Display an adjusted image based on the display brightness of each pixel in the adjusted image.

The HUD system mounted on the vehicle is used as an example. A display component of the HUD system may display a real image of the adjusted image and project the real image onto a windshield of the vehicle based on the display brightness of each pixel in the adjusted image, to form a HUD image in front of the windshield of the vehicle for viewing by the user.

The following uses a positive correlation between a brightness weakening coefficient of a pixel and a weakening degree of display brightness of the pixel as an example, to describe how to obtain the brightness weakening coefficient of each pixel based on the distance between each pixel in the image and the reference position.

Figure 5:
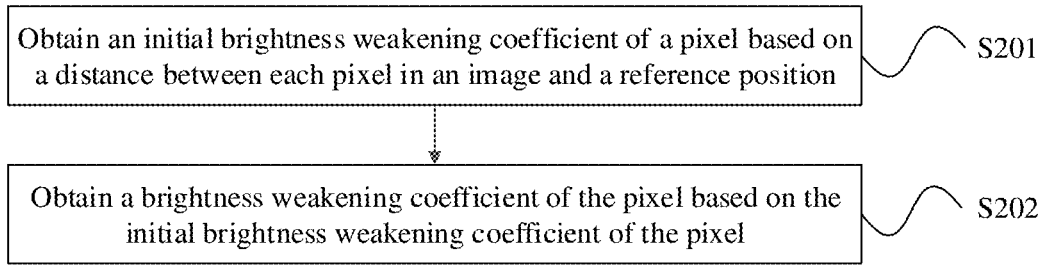
FIG. 5 is a schematic flowchart of a display adjustment method according to an embodiment.

FIG. 5 is a schematic flowchart of a display adjustment method according to an embodiment. This embodiment relates to how a HUD system obtains a brightness weakening coefficient of each pixel based on a distance between each pixel in an image and a reference position. For example, this function may be implemented by a processor of the HUD system. As shown in FIG. 5, the method may include the following steps:

S201: Obtain an initial brightness weakening coefficient of a pixel based on a distance between each pixel in an image and a reference position.

For example, the reference position is used as a central position of brightness weakening. An initial brightness weakening coefficient of a pixel in which the reference position is located may be zero, in other words, brightness of the pixel in which the reference position is located remains unchanged, and initial brightness weakening coefficients of the remaining pixels gradually increase as distances between the remaining pixels and the reference position increase. In this case, the reference position may be same as or different from a focal position. That is, the reference position and the focal position may be a same position or different positions in a HUD image.

For example, the initial brightness weakening coefficient of the pixel may be obtained through the following formula (1):

$$V_{pix\_1}^i = \begin{cases} \dfrac{\alpha 1}{dist(i)^{n1}} + \beta 1 & (dist(i)^{n1} \neq 0) \\ 0 & (dist(i)^{n1} = 0) \end{cases} \quad (1)$$

In the foregoing formula, i is an integer that is greater than or equal to 0, $V_{pix\_1}^i$ an initial brightness weakening coefficient of an $i^{th}$ pixel of the HUD image, dist(i) is a distance between the $i^{th}$ pixel and the reference position, n1 and α1 each are a positive real number, and β1 is a real number. n1, α1, and β1 may be set according to a requirement of a user. It should be understood that n1 represents that non-linear transformation is performed on the parameter dist(i), so that pixels with different distances between the pixels and the reference position have different initial brightness weakening coefficients.

The distance dist(i) between the $i^{th}$ pixel and the reference position may be, for example, a European distance between the $i^{th}$ pixel and the reference position, may be a distance between the $i^{th}$ pixel and the reference position on an X-axis, or may be a distance between the $i^{th}$ pixel and the reference position on a Y-axis. The European distance is used as an example. In this case, dist(i) may be obtained, for example, through the following formula (2):

$$dist(i) = \sqrt{(x_i - x_{pix})^2 + (y_i - y_{pix})^2} \quad (2)$$

In the foregoing formula, $x_i$ is a value of the $i^{th}$ pixel on the x coordinate axis in the HUD image, $y_i$ is a value of the $i^{th}$ pixel on the y coordinate axis in the HUD image, and $x_{pix}$ is a value of the reference position on the x coordinate axis in the HUD image, and $y_{pix}$ is the value of the reference position on the y coordinate axis in the HUD image.

For example, the focal position is used as the central position of brightness weakening to perform brightness weakening on the HUD image. An initial brightness weakening coefficient of a pixel in which the focal position is located may be zero, in other words, brightness of the pixel in which the focal position is located remains unchanged, and initial brightness weakening coefficients of the remaining pixels gradually increase as distances between the remaining pixels and the focal position increase. In this case, the reference position may be different from the focal position. That is, the reference position and the focal position may be different positions in the HUD image.

The HUD system can obtain the initial brightness weakening coefficient of the pixel based on the distance between each pixel in the HUD image and the reference position and an offset of the focal position relative to the reference position. For example, the initial brightness weakening coefficient of the pixel may be obtained through the following formula (3):

$$V_{pix\_1}^i = \begin{cases} \dfrac{\alpha 2}{dist(i-\sigma)^{n2}} + \beta 2 & (dist(i-\sigma)^{n2} \neq 0) \\ 0 & (dist(i-\sigma)^{n2} = 0) \end{cases} \quad (3)$$

In the foregoing formula, i is an integer that is greater than or equal to 0, $V_{pix\_1}^i$ an initial brightness weakening coefficient of an $i^{th}$ pixel, dist(i−σ) is a distance between n $(i-\sigma)^{th}$ pixel and the reference position, σ is the offset of the focal position relative to the reference position, n2 and α2 each are a positive real number, and β2 is a real number. n2, α2, and β2 may be set according to a requirement of the user. It should be understood that n2 represents that non-linear transformation is performed on the parameter dist(i−σ), so that pixels with different distances between the pixels and the reference position have different initial brightness weakening coefficients.

The distance dist(i−σ) between the $(i-\sigma)^{th}$ pixel and the reference position may be, for example, a European distance between the $(i-\sigma)^{th}$ pixel and the reference position, may be a distance between the $(i-\sigma)^{th}$ pixel and the reference position on the X-axis, or may be a distance between the $(i-\sigma)^{th}$ pixel and the reference position on the Y-axis. The European distance is used as an example. In this case, dist(i−σ) may be obtained, for example, through the following formula (4):

$$dist(i-\sigma) = \sqrt{(x_{i-\sigma} - x_{pix})^2 + (y_{i-\sigma} - y_{pix})^2} \quad (4)$$

S202: Obtain a brightness weakening coefficient of the pixel based on the initial brightness weakening coefficient of the pixel.

For example, the following four implementations may be included:

In a first implementation, the initial brightness weakening coefficient is used as the brightness weakening coefficient of the pixel. The initial brightness weakening coefficient of each pixel in the HUD image is used to adjust the display brightness of each pixel in the HUD image.

When the reference position is used as the central position of brightness weakening, an adjusted HUD image obtained in this implementation is a HUD image that is centered on the reference position and whose brightness of surrounding pixels is gradually weakened. When the focal position is used as the central position of brightness weakening, the adjusted HUD image obtained in this implementation is a HUD image that is centered on the focal position and whose brightness of surrounding pixels is gradually weakened.

Figure 6:
FIG. 6 is a schematic diagram 1 of an adjusted HUD image according to an embodiment.

FIG. 6 is a schematic diagram 1 of the adjusted HUD image provided in this embodiment. As shown in FIG. 6, that this implementation is used to adjust the display brightness of the HUD image shown in FIG. 1 is used as an example. In this example, the focal position is used as the central position of brightness weakening. In this case, the adjusted HUD image may be shown in FIG. 6. In FIG. 6, a black circle represents the focal position. Black circles in subsequent schematic diagrams of the HUD image represent a same meaning, and details are not described again.

In a second implementation, initial brightness weakening coefficients are filtered by using a preset threshold, so that an initial brightness weakening coefficient that exceeds the preset threshold can be adjusted. For example, if the initial brightness weakening coefficient of the pixel is greater than or equal to the preset threshold, the brightness weakening coefficient of the pixel is set to a first value; or if the initial brightness weakening coefficient of the pixel is less than the preset threshold, the initial brightness weakening coefficient of the pixel is used as the brightness weakening coefficient of the pixel. The brightness weakening coefficient may be represented by the following formula (5):

$$V_{pix\_2}^i = \begin{cases} V_{pix\_1}^i & (V_{pix_1}^i < V_{thresh}) \\ a & (V_{pix_1}^i \geq V_{thresh}) \end{cases} \quad (5)$$

In the foregoing formula, $V_{pix\_2}^i$ is the brightness weakening coefficient of the $i^{th}$ pixel, V_thresh is the preset threshold, and a is the first value. A value of a may be greater than the preset threshold and may be set according to a requirement of the user.

Optionally, the preset threshold may be preset; the preset threshold may be determined based on an initial brightness weakening coefficient of a pixel located at an edge of the HUD image; or the preset threshold is input by the user, that is, the HUD system can receive the preset threshold input by the user. For example, the preset threshold may be a real number that is greater than 0 and is less than the initial brightness weakening coefficient of the pixel located at the edge of the HUD image.

That the value of a is infinite is used as an example. In this case, in this implementation, for a pixel whose initial brightness weakening coefficient is less than the preset threshold, display brightness is adjusted by using the initial brightness weakening coefficient of the pixel; and a pixel whose initial brightness weakening coefficient is greater than or equal to the preset threshold is not displayed.

Figure 7:
FIG. 7 is a schematic diagram 2 of an adjusted HUD image according to an embodiment.

FIG. 7 is a schematic diagram 2 of the adjusted HUD image provided in this embodiment. As shown in FIG. 7, that the display brightness of the HUD image shown in FIG. 1 is adjusted in this implementation is used as an example. It is assumed that the first value is infinite and the focal position is used as the central position of brightness weakening. In this example, the adjusted HUD image may be shown in FIG. 7. It can be understood from comparison between FIG. 1 and FIG. 7 that, for pixels whose initial brightness weakening coefficients are less than the preset threshold, brightness of each pixel is gradually weakened as a distance between the pixel and the focal position increases. A pixel whose initial brightness weakening coefficient is greater than or equal to the preset threshold is not displayed.

In a third implementation, a user focus area is used to filter initial brightness weakening coefficients, to adjust the initial brightness weakening coefficient of a pixel beyond the user focus area. The user focus area may be a circular area, a square area, a rectangular area, a rhombic area, a trapezoidal area, or the like, or may be an area of a shape customized by the user, for example, an area of an irregular shape. The user focus area is related to the focal position or reference position. For example, when the reference position is used as the central position of brightness weakening, the user focus area may be an area centered on the reference position. When the focal position is used as the central position of brightness weakening, the user focus area may be an area centered on the focal position.

For example, when the pixel is located in the user focus area, the initial brightness weakening coefficient of the pixel is used as the brightness weakening coefficient of the pixel. If the pixel is not located in the user focus area, the brightness weakening coefficient of the pixel is set to a second value. For example, the user focus area is a rectangular area. The brightness weakening coefficient may be represented by the following formula (6):

$$V_{pix\_3} = \begin{cases} b & \text{if } \left(|x_i - x_{center}| > \frac{w_{thresh}}{2} \text{ or } |y_i - y_{center}| > \frac{h_{thresh}}{2}\right) \\ V_{pix\_1}^i & \text{else} \end{cases} \quad (6)$$

In the foregoing formula, $V_{pix\_3}$ is the brightness weakening coefficient of the $i^{th}$ pixel, $w_{thresh}$ is the width of the user focus area, $h_{thresh}$ is the height of the user focus area, $x_{center}$ is a value of the center of the user focus area on the x coordinate axis of the HUD image, $y_{center}$ is a value of the center of the user focus area on the y coordinate axis of the HUD image, and b is the second value. A value of b may be set according to a requirement of the user.

That the value of b is infinite is used as an example. In this case, in this implementation, for a pixel located in the user focus area, display brightness is adjusted by using an initial brightness weakening coefficient of the pixel, and a pixel that is not located in the user focus area is not displayed. In this case, the obtained adjusted HUD image may be a HUD image that only includes pixels in the user focus area, and brightness of the pixels in the user focus area is gradually weakened from a center point to an edge.

Figure 8:
FIG. 8 is a schematic diagram 3 of an adjusted HUD image according to an embodiment.

FIG. 8 is a schematic diagram 3 of the adjusted HUD image provided in this embodiment. As shown in FIG. 8, that the display brightness of the HUD image shown in FIG. 1 is adjusted in this implementation is used as an example. It is assumed that the user focus area is a rectangular area and the focal position is used as the central position of brightness weakening. In this example, the adjusted HUD image may be shown in FIG. 8. It can be understood from comparison between FIG. 1 and FIG. 8 that, for the pixels located in the user focus area, brightness of each pixel is gradually weakened as a distance between the pixel and the focal position increases. The pixels that are not located in the user focus area are not displayed.

In a fourth implementation, a preset threshold and the user focus area are used to perform secondary filtering on initial brightness weakening coefficients.

For example, if the initial brightness weakening coefficient of the pixel is greater than or equal to the preset threshold, the brightness weakening coefficient of the pixel is set to a third value; if the initial brightness weakening coefficient of the pixel is less than the preset threshold and the pixel is not located in the user focus area, the brightness weakening coefficient of the pixel is set to a fourth value; or if the initial brightness weakening coefficient of the pixel is less than the preset threshold and the pixel is located in the user focus area, the initial brightness weakening coefficient of the pixel is used as the brightness weakening coefficient of the pixel.

For example, the user focus area is a rectangular area. The brightness weakening coefficient may be represented by the following formula (7):

$$V_{pix\_4} = \begin{cases} c & (V_{pix\_1}^i < V_{thresh}) \\ d & (V_{pix\_1}^i < V_{thresh}) \text{ and } \left(|x_i - x_{center}| > \frac{w_{thresh}}{2} \text{ or } |y_i - y_{center}| > \frac{h_{thresh}}{2}\right) \\ V_{pix\_1}^i & (V_{pix\_1}^i < V_{thresh}) \text{ and } \left(|x_i - x_{center}| \leq \frac{w_{thresh}}{2} \text{ or } |y_i - y_{center}| \leq \frac{h_{thresh}}{2}\right) \end{cases} \quad (7)$$

In the foregoing formula, c is the third value, and d is the fourth value. It should be understood that values of c and d may be greater than the preset threshold and may be set according to a requirement of the user. c and d may be equal or not equal. For example, the values of c and d are infinite.

It should be understood that, when the reference position is used as the central position of brightness weakening, the center of the user focus area may be the reference position.

When the focal position is used as the central position of brightness weakening, the center of the user focus area may be the focal position.

That the values of c and d are infinite is used as an example. In this case, in this implementation, for a pixel that is located in the user focus area and whose initial brightness weakening coefficient is less than the preset threshold, display brightness is adjusted by using the initial brightness weakening coefficient of the pixel; and a pixel that is not located in the user focus area or whose initial brightness weakening coefficient is greater than or equal to the preset threshold is not displayed.

Figure 9:
FIG. 9 is a schematic diagram 4 of an adjusted HUD image according to an embodiment.

FIG. 9 is a schematic diagram 4 of the adjusted HUD image provided in this embodiment. As shown in FIG. 9, that the display brightness of the HUD image shown in FIG. 1 is adjusted in this implementation is used as an example. It is assumed that the user focus area is a rectangular area, the focal position is used as the central position of brightness weakening, and both the third value and the fourth value are infinite. In this example, the adjusted HUD image may be shown in FIG. 9. It can be understood from comparison between FIG. 1 and FIG. 9 that, for pixels whose initial brightness weakening coefficients are less than the preset threshold and that are located in the user focus area, brightness of each pixel is gradually weakened as a distance between the pixel and the focal position increases. A pixel whose initial brightness weakening coefficient is greater than or equal to the preset threshold or that is not located in the user focus area is not displayed.

It should be understood that the foregoing four implementations are only examples for obtaining the brightness weakening coefficient of each pixel based on the distance between each pixel in the image and the reference position. A person skilled in the art may also obtain the brightness weakening coefficient of each pixel in another manner based on the distance between each pixel in the image and the reference position. This is not limited herein.

It should be understood that, in all the foregoing examples, a positive correlation between a brightness weakening coefficient of a pixel and a weakening degree of display brightness of the pixel is used as an example, to describe how to obtain the brightness weakening coefficient of each pixel based on the distance between each pixel in the image and the reference position. However, a person skilled in the art may also obtain the foregoing effects by appropriately changing the formulas and by using a rule that a brightness weakening coefficient of a pixel is negatively correlated with a brightness weakening degree of the pixel. Details are not described herein again.

Figure 10:
FIG. 10 is a schematic diagram 5 of an adjusted HUD image according to an embodiment.

It should be noted that, when the display adjustment method provided in this embodiment is used and the user views the HUD image, if the focal position of the user moves, the adjusted HUD image obtained by the HUD system in the foregoing method embodiments moves with movement of the focal position of the user. FIG. 10 is a schematic diagram 5 of the adjusted HUD image provided in this embodiment. That the first implementation is used to obtain the brightness weakening coefficient of the pixel in the HUD image is used as an example. With reference to FIG. 6 and FIG. 10, it can be understood from comparison between FIG. 6 and FIG. 10 that when the focal position of the user moves, the adjusted HUD image changes with the movement of the focal position of the user.

It should be noted that in all the foregoing examples (FIG. 1 and FIG. 6 to FIG. 10), the HUD image displaying lane lines is used as an example to describe the solutions in embodiments. However, a person skilled in the art may understand that content included in the HUD image before brightness adjustment may be related to the HUD system and user settings. This is not limited in this embodiment.

In the display adjustment method provided in this embodiment, the display brightness of each pixel in the HUD image can be adjusted based on the reference position related to the focal position, to weaken the brightness of the pixel in the area on which the driver does not focus, so that the driver focuses more on the information in the HUD image to be obtained by the driver. Therefore, a case in which the driver is distracted by irrelevant information when viewing the HUD image can be avoided, and visual fatigue of the driver can be reduced. This plays an important role in reducing occurrence of traffic accidents.

Figure 11:
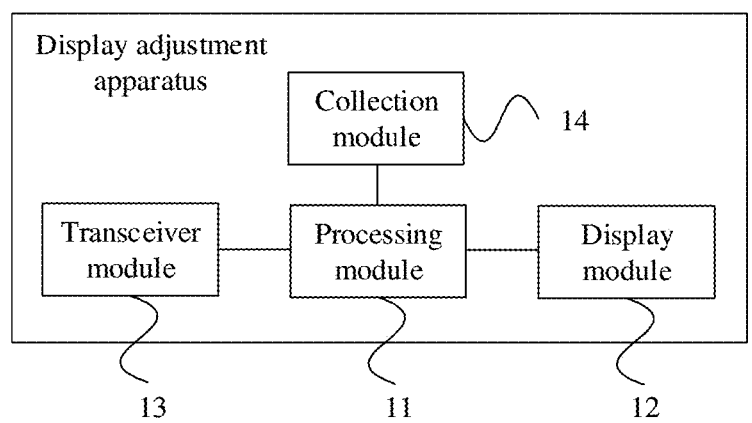
FIG. 11 is a schematic diagram of a structure of a display adjustment apparatus according to an embodiment.

FIG. 11 is a schematic diagram of a structure of a display adjustment apparatus according to an embodiment. As shown in FIG. 11, the display adjustment apparatus may be the foregoing described HUD system or a chip of the HUD system. The display adjustment apparatus includes a processing module 11 and a display module 12. Optionally, the apparatus may further include a transceiver module 13 and/or a collection module 14.

The processing module 11 is configured to: obtain a reference position from an image displayed by a HUD system, where the reference position is related to a focal position, on the image displayed by the HUD system, of an eye of a user; obtain a brightness weakening coefficient of each pixel based on a distance between each pixel in the image and the reference position; and adjust display brightness of each pixel in the image based on the brightness weakening coefficient of each pixel.

The display module 12 is configured to display an adjusted image based on the display brightness of each pixel of the adjusted image.

In a possible implementation, the brightness weakening coefficient of the pixel is positively correlated with a weakening degree of the display brightness of the pixel.

In a possible implementation, the processing module 11 is configured to: obtain an initial brightness weakening coefficient of a pixel based on a distance between each pixel in the image and the reference position; and obtain a brightness weakening coefficient of the pixel based on the initial brightness weakening coefficient of the pixel.

For example, the brightness weakening coefficient of the pixel may be obtained based on the initial brightness weakening coefficient of the pixel in the following four manners:

In a first manner, the initial brightness weakening coefficient is used as the brightness weakening coefficient of the pixel.

In a second manner, if the initial brightness weakening coefficient of the pixel is greater than or equal to a preset threshold, the brightness weakening coefficient of the pixel is set to a first value, where the first value is greater than the preset threshold. Alternatively, if the initial brightness weakening coefficient of the pixel is less than the preset threshold, the initial brightness weakening coefficient of the pixel is used as the brightness weakening coefficient of the pixel.

In a third manner, if the pixel is located in a user focus area, the initial brightness weakening coefficient of the pixel is used as the brightness weakening coefficient of the pixel, where the user focus area is related to the focal position or the reference position. If the pixel is not located in the user focus area, the brightness weakening coefficient of the pixel is set to a second value.

In a fourth manner, if the initial brightness weakening coefficient of the pixel is greater than or equal to a preset threshold, the brightness weakening coefficient of the pixel is set to a third value, where the third value is greater than the preset threshold. Alternatively, if the initial brightness weakening coefficient of the pixel is less than the preset threshold and the pixel is not located in a user focus area, the brightness weakening coefficient of the pixel is set to a fourth value, where the fourth value is greater than the preset threshold, and the user focus area is related to the focal position or the reference position. Alternatively, if the initial brightness weakening coefficient of the pixel is less than the preset threshold and the pixel is located in the user focus area, the initial brightness weakening coefficient of the pixel is used as the brightness weakening coefficient of the pixel.

Optionally, the preset threshold is preset; the preset threshold is determined based on an initial brightness weakening coefficient of a pixel located at an edge of the image; or the processing module 11 is further configured to receive, through the transceiver module 13, a preset threshold input by the user. For example, the preset threshold may be a real number that is greater than 0 and is less than the initial brightness weakening coefficient of the pixel located at the edge of the image.

Optionally, that the brightness weakening coefficient of the pixel is positively correlated with the weakening degree of the display brightness of the pixel is used as an example. When the reference position is used as a central position of brightness weakening, the initial brightness weakening coefficient of the pixel meets the following formula:

$$V_{pix\_1}^{i} = \begin{cases} \dfrac{\alpha}{dist(i)^n} + \beta & (dist(i)^n \neq 0) \\ 0 & (dist(i)^n = 0) \end{cases}$$

In the foregoing formula, i is an integer that is greater than or equal to 0, $V_{pix\_1}^{i}$ an initial brightness weakening coefficient of an $i^{th}$ pixel, dist(i) is a distance between the $i^{th}$ pixel and the reference position, n and $\alpha$ each are a positive real number, and $\beta$ is a real number.

It should be understood that the reference position may be same as or different from the focal position. That is, the reference position and the focal position may be a same position or different positions in the HUD image. In other words, the reference position is the focal position, the reference position is not the focal position, or the like.

Optionally, that the brightness weakening coefficient of the pixel is positively correlated with the weakening degree of the display brightness of the pixel is used as an example. When the focal position is used as the central position of brightness weakening, the processing module 11 is configured to obtain the initial brightness weakening coefficient of the pixel based on the distance between each pixel in the image and the reference position and an offset of the focal position relative to the reference position. For example, the initial rightness weakening coefficient of the pixel meets the following formula:

$$V_{pix\_1}^{i} = \begin{cases} \dfrac{\alpha}{dist(i - \sigma)^n} + \beta & (dist(i - \sigma)^n \neq 0) \\ 0 & (dist(i - \sigma)^n = 0) \end{cases}$$

In the foregoing formula, i is an integer that is greater than or equal to 0, $V_{pix\_1}^{i}$ is an initial brightness weakening coefficient of an $i^{th}$ pixel, dist(i–σ) is a distance between an (i–σ)$^{th}$ pixel and the reference position, σ is the offset of the focal position relative to the reference position, n and α each are a positive real number, and β is a real number.

In a possible implementation, the processing module 11 is configured to adjust the display brightness of each pixel in the image based on the brightness weakening coefficient of each pixel by using a spatial light modulator of the HUD system. For example, the spatial light modulator includes a first sub-spatial light modulator and a second sub-spatial light modulator, and an image pixel of the first sub-spatial light modulator is aligned with an image pixel of the second sub-spatial light modulator. The processing module 11 is configured to: load the brightness weakening coefficient of each pixel into the first sub-spatial light modulator, to obtain a brightness adjustment image; and load the image into the second sub-spatial light modulator, where the brightness adjustment image is used to adjust brightness of a light source emitted to the second sub-spatial light modulator, to change display brightness of each pixel in the image loaded into the second sub-spatial light modulator.

In a possible implementation, the processing module 11 is further configured to receive, through the transceiver module 13, the focal position sent by a visual positioning apparatus before obtaining the reference position from the image displayed by the HUD system.

In a possible implementation, the processing module 11 is further configured to receive, through the transceiver module, the focal position sent by a visual positioning apparatus before obtaining the reference position from the image displayed by the HUD system; the collection module 14 is configured to collect a facial image of the user when the user views the image; and the processing module 11 is configured to determine a position of an eye of the user based on the facial image, and obtain the focal position based on the position of the eye of the user and a mapping relationship between the position of the eye and coordinate points of the image.

The display adjustment apparatus provided in this embodiment may perform actions of the HUD system in the foregoing method embodiments. Implementation principles and effects of the display adjustment apparatus are similar to those in the method embodiments, and details are not described herein again.

Optionally, the display adjustment apparatus may further include at least one storage module. The storage module may include data and/or instructions. The processing module, the transceiver module, the display module, and the collection module can read the data and/or the instructions in the storage module to implement a corresponding method.

It should be noted that it should be understood that the transceiver module may be a transceiver or a communication interface in actual implementation, and the collection module may be a camera sensor in actual implementation. In addition, the processing module may be implemented by using software invoked by a processing element and may alternatively be implemented by using hardware. For example, the processing module may be a separately disposed processing element or may be integrated into a chip of the foregoing apparatus for implementation. In addition, the processing module may be stored in a memory of the foregoing apparatus in a form of program code, and a processing element of the foregoing apparatus invokes and executes a function of the processing module. In addition, all or some of these modules may be integrated together or implemented independently. The processor element described herein may be an integrated circuit and has a signal processing capability. In an implementation process, steps in the foregoing methods or the foregoing modules can be implemented by using a hardware integrated logical circuit in the processing element, or by using instructions in a form of software.

For example, the foregoing modules may be one or more integrated circuits configured to implement the foregoing method, such as one or more application specific integrated circuits (ASIC), one or more microprocessors, or one or more field programmable gate arrays (FPGA). For another example, when one of the foregoing modules is implemented by scheduling program code by a processing element, the processing element may be a general-purpose processor, for example, a central processing unit (CPU) or another processor that can invoke program code. For another example, these modules may be integrated together and implemented in a form of a system-on-a-chip (SoC).

The embodiments may further provide a HUD system as shown in FIG. 2. The HUD system includes a processor, a memory, and a display component. The memory is configured to store computer executable instructions. The processor is configured to execute the computer executable instructions stored in the memory, to adjust display brightness of each pixel in an image by using the method provided in the foregoing method embodiments. The display component is configured to display a real image of an adjusted image based on the display brightness of each pixel in the adjusted image.

An embodiment may further provide a non-transitory computer readable storage medium. The non-transitory computer readable storage medium stores computer instructions used to implement the method executed by the HUD system in the foregoing method embodiments. For example, when the computer instructions are executed, the HUD system may implement the actions in the foregoing method embodiments.

An embodiment may further provide a computer program product that includes instructions. When the instructions are executed, a computer is enabled to implement the method executed by the HUD system in the foregoing method embodiments.

An embodiment may further provide a manner of transportation, and the manner of transportation includes the HUD system described in the foregoing embodiments.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, all or some of the procedures or functions according to the embodiments are generated. The computer may be a general-purpose computer, a dedicated computer, a computer network, or other programmable apparatuses. The computer instructions may be stored in a non-transitory computer-readable storage medium or may be transmitted from a non-transitory computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid-State Drive (SSD)), or the like.

"A plurality of" means two or more. The term "and/or" in the embodiments describes only an association relationship for describing associated objects and represents that three relationships may exist. For example, A and/or B may represent the following three cases: only A exists, both A and B exist, and only B exists. In addition, the character "/" may indicate an "or" relationship between associated objects; and in formulas, the character "/" may indicate a "division" relationship between associated objects.

It can be understood that various numeral numbers in the embodiments are only used for differentiation for convenient description and are not used to limit the embodiments.

It should be understood that sequence numbers of the foregoing processes do not mean execution sequences in the embodiments. The execution sequences of the processes should be determined according to functions and internal logic of the processes and should not be construed as any limitation on the implementation processes of the embodiments.

What is claimed is:

1. A display adjustment method applied to a display system, the method comprising:
    obtaining a reference position from an image displayed by the display system, wherein the reference position is related to a focal position, on the displayed image, of an eye of a user;
    adjusting display brightness of a pixel in the image based on a distance between the pixel in the image and the reference position wherein the distance between the pixel and the reference position is positively correlated with the display brightness of the pixel;
    and
    displaying an adjusted image based on the display brightness of the pixel in the adjusted image,
    wherein adjusting the display brightness of the pixel in the image based on the distance between the pixel in the image and the reference position further comprises:
        obtaining a brightness weakening coefficient of the pixel based on the distance between the pixel in the image and the reference position; and
        adjusting the display brightness of the pixel in the image based on the brightness weakening coefficient of the pixel,
    wherein obtaining the brightness weakening coefficient of the pixel based on the distance between the pixel in the image and the reference position further comprises:
        obtaining an initial brightness weakening coefficient of the pixel based on the distance between the pixel in the image and the reference position; and
        obtaining the brightness weakening coefficient of the pixel based on the initial brightness weakening coefficient of the pixel, and
    wherein obtaining the brightness weakening coefficient of the pixel based on the initial brightness weakening coefficient of the pixel further comprises:
        when the pixel is located in a user focus area, using the initial brightness weakening coefficient of the pixel as the brightness weakening coefficient of the pixel, wherein the user focus area is related to the focal position or the reference position; or
        when the pixel is not located in the user focus area, setting the brightness weakening coefficient of the pixel to a second value.

2. The display adjustment method according to claim 1, wherein obtaining the brightness weakening coefficient of the pixel based on the initial brightness weakening coefficient of the pixel further comprises:
when the initial brightness weakening coefficient of the pixel is greater than or equal to a preset threshold, setting the brightness weakening coefficient of the pixel to a first value, wherein the first value is greater than the preset threshold; or
when the initial brightness weakening coefficient of the pixel is less than the preset threshold, using the initial brightness weakening coefficient of the pixel as the brightness weakening coefficient of the pixel.

3. The display adjustment method according to claim 1, wherein obtaining the brightness weakening coefficient of the pixel based on the initial brightness weakening coefficient of the pixel further comprises:
when the initial brightness weakening coefficient of the pixel is greater than or equal to Hall the preset threshold, setting the brightness weakening coefficient of the pixel to a third value, wherein the third value is greater than the preset threshold;
when the initial brightness weakening coefficient of the pixel is less than the preset threshold and the pixel is not located in a user focus area, setting the brightness weakening coefficient of the pixel to a fourth value, wherein the fourth value is greater than the preset threshold, and the user focus area is related to the focal position or the reference position; or
when the initial brightness weakening coefficient of the pixel is less than the preset threshold and the pixel is located in the user focus area, using the initial brightness weakening coefficient of the pixel as the brightness weakening coefficient of the pixel.

4. The display adjustment method according to claim 1, wherein
the preset threshold is preset;
the preset threshold is determined based on an initial brightness weakening coefficient of a pixel located at an edge of the image; or
the method further comprises:
receiving the preset threshold input by the user.

5. The display adjustment method according to claim 4, wherein the preset threshold is a real number that is greater than 0 and is less than the initial brightness weakening coefficient of the pixel located at the edge of the image.

6. The display adjustment method according to claim 1, wherein the reference position is the focal position.

7. The display adjustment method according to claim 1, wherein obtaining the initial brightness weakening coefficient of the pixel based on the distance between the pixel in the image and the reference position further comprises:
obtaining the initial brightness weakening coefficient of the pixel based on the distance between the pixel in the image and the reference position and an offset of the focal position relative to the reference position.

8. The display adjustment method according to claim 1, wherein adjusting the display brightness of the pixel in the image based on the brightness weakening coefficient of the pixel further comprises:
adjusting the display brightness of the pixel in the image based on the brightness weakening coefficient of the pixel by using a spatial light modulator of the display system.

9. The display adjustment method according to claim 8, wherein the spatial light modulator comprises a first sub-spatial light modulator and a second sub-spatial light modulator, and an image pixel of the first sub-spatial light modulator is aligned with an image pixel of the second sub-spatial light modulator; and adjusting the display brightness of the pixel in the image based on the brightness weakening coefficient of the pixel by using the spatial light modulator of the display system further comprises:
loading the brightness weakening coefficient of the pixel into the first sub-spatial light modulator, to obtain a brightness adjustment image; and
loading the image into the second sub-spatial light modulator, wherein the brightness adjustment image is used to adjust brightness of a light source emitted to the second sub-spatial light modulator, to change display brightness of a pixel in the image loaded into the second sub-spatial light modulator.

10. The display adjustment method according to claim 1, wherein, before obtaining the reference position, the method further comprises:
collecting a facial image of the user when the user views an image;
determining a position of an eye of the user based on the facial image; and
obtaining the focal position based on the position of the eye of the user and a mapping relationship between the position of the eye and coordinate points of the image.

11. A display adjustment apparatus comprising a processor and an interface circuit, wherein the interface circuit is configured to receive computer-executable instructions and transmit the computer-executable instructions to the processor, and the processor runs the computer-executable instructions to perform a display adjustment method, wherein the method is applied to a display system, and the method comprises:
obtaining a reference position from an image displayed by the display system, wherein the reference position is related to a focal position, on the displayed image, of an eye of a user;
adjusting display brightness of a pixel in the image based on a distance between the pixel in the image and the reference position, wherein the distance between the pixel and the reference position is positively correlated with the display brightness of the pixel; and
displaying an adjusted image based on the display brightness of the pixel in the adjusted image,
wherein adjusting the display brightness of the pixel in the image based on the distance between the pixel in the image and the reference position further comprises:
obtaining a brightness weakening coefficient of the pixel based on the distance between the pixel in the image and the reference position; and
adjusting the display brightness of the pixel in the image based on the brightness weakening coefficient of the pixel,
wherein obtaining the brightness weakening coefficient of the pixel based on the distance between the pixel in the image and the reference position further comprises:
obtaining an initial brightness weakening coefficient of the pixel based on the distance between the pixel in the image and the reference position; and
obtaining the brightness weakening coefficient of the pixel based on the initial brightness weakening coefficient of the pixel, and
wherein obtaining the brightness weakening coefficient of the pixel based on the initial brightness weakening coefficient of the pixel further comprises:
when the pixel is located in a user focus area, using the initial brightness weakening coefficient of the pixel as the brightness weakening coefficient of the pixel, wherein the user focus area is related to the focal position or the reference position; or when the pixel is not located in the user focus area, setting the brightness weakening coefficient of the pixel to a second value.

12. A display system, comprising:
a memory configured to store computer-executable instructions;
a spatial light modulator configured to display an image, wherein the spatial light modulator comprises a first sub-spatial light modulator and a second sub-spatial light modulator, and an image pixel of the first sub-spatial light modulator is aligned with an image pixel of the second sub-spatial light modulator; and
a processor configured to:
execute the computer-executable instructions stored in the memory,
obtain a focal position, on the image displayed by the display system, of an eye of a user, and
enable the spatial light modulator to adjust display brightness of each pixel in the displayed image based on a distance between each pixel in the image and the focal position, by loading a brightness weakening coefficient of the pixel into the first sub-spatial light modulator, to obtain a brightness adjustment image; and loading the image into the second sub-spatial light modulator, wherein the brightness adjustment image is used to adjust brightness of a light source emitted to the second sub-spatial light modulator, to change display brightness of a pixel in the image loaded into the second sub-spatial light modulator.

13. The display system according to claim 12, further comprising:
a reflector configured to reflect light emitted by the spatial light modulator to a windshield of a vehicle.

14. A vehicle, comprising the display system according to claim 12.

* * * * *